(12) United States Patent
Ganachaud et al.

(10) Patent No.: US 6,230,732 B1
(45) Date of Patent: May 15, 2001

(54) SAFETY VALVE FOR A LIQUID TANK

(75) Inventors: Patrick Ganachaud; Alain Denis, both of Laval (FR)

(73) Assignee: Solvay, S.A., Brussels (BE)

(*) Notice: Subject to any disclaimer, the term of this patent is extended or adjusted under 35 U.S.C. 154(b) by 0 days.

(21) Appl. No.: 09/310,573

(22) Filed: May 12, 1999

(30) Foreign Application Priority Data

Jun. 2, 1998 (BE) .................................................. 09800420

(51) Int. Cl.⁷ .................................................. F16K 17/36
(52) U.S. Cl. .................................................. 137/39; 137/43
(58) Field of Search .................................................. 137/38, 43, 39

(56) References Cited

U.S. PATENT DOCUMENTS

| | | | |
|---|---|---|---|
| 4,694,847 | * 9/1987 | Szlaga | 137/39 |
| 4,886,089 | * 12/1989 | Gabrlik et al. | 137/202 |
| 5,638,856 | 6/1997 | Ohsaki | 137/43 |
| 5,678,590 | 10/1997 | Kasugai et al. | 137/43 |
| 5,809,976 | * 9/1998 | Cook et al. | 123/516 |
| 5,971,002 | 10/1999 | Turpin et al. | 137/43 |

FOREIGN PATENT DOCUMENTS 0 803 671 A1   10/1997 (EP).
WO 98/15761    4/1998 (WO).

* cited by examiner

*Primary Examiner*—Stephen M. Hepperle
(74) *Attorney, Agent, or Firm*—Venable; Marina V. Schneller

(57) ABSTRACT

Safety valve for venting a liquid tank, comprising means for ventilating the tank, including when the latter is inclined, for preventing liquid from being ejected if the tank is inclined or if waves of liquid are produced, for automatically closing in the event of inversion, for adjusting the useful volume and for allowing gas to escape during filling. As a preference, it also comprises means for ventilating it in the event of a depression or overpressure. The valve is characterized in that a flexible seal equips the seat of a valve element.

Figure 1:
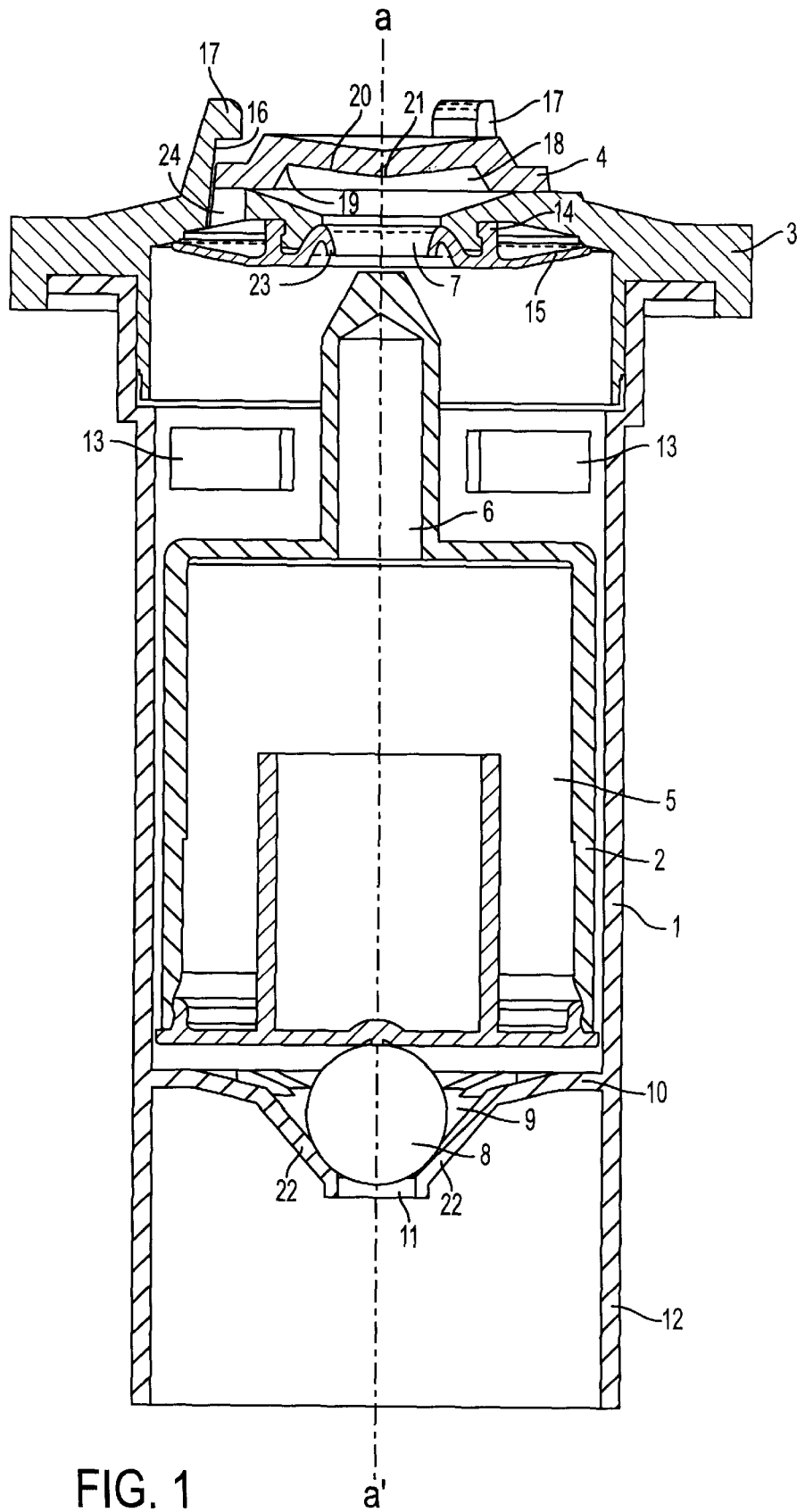

As a preference, the head of the valve also comprises means for preventing dirt from getting into the tank.

The valve is well suited to fuel tanks for diesel-engine motor cars.

9 Claims, 1 Drawing Sheet

SAFETY VALVE FOR A LIQUID TANK

The present invention relates to a safety valve for venting a liquid tank.

Liquid tanks, when they are liable to be moved along with the liquid they contain, have to be equipped with a ventilating system which is reliable as far as the environment is concerned while the tank is subjected to various influences: movements in all directions and of all amplitudes, thermal stresses, depressions and overpressures.

This requirement is encountered in the case of fuel tanks, particularly when they are mounted on motor vehicles, and it is essential that liquid fuel should be prevented from getting out and that significant changes in pressure and volume of gas during filling and throughout storage in the tank be controlled.

For many years, solutions to these problems have been provided by the use of special gas-release circuits combined with vent valves. In certain devices, the functions of allowing gas to escape during filling and of ventilating in the event of a depression are provided by a complex valve which incorporates a second spring-loaded valve arranged in series with a first main float valve, like in the valve described in U.S. Pat. No. 5,518,018.

These valves do, however, have the drawback of being difficult to manufacture because of their complexity and because numerous springs made of an elastic material made of a different substance than the rest of the valve are mounted inside them. Furthermore, they are generally relatively bulky, tricky to operate, and expensive.

The invention aims to provide a single valve capable of fulfilling all the safety functions described above but which is simple to manufacture, reliable, and inexpensive.

To this end, the invention relates to a safety valve for venting a liquid tank, comprising means for:
a) ventilating the tank, including when the latter is inclined with respect to the initial position for which it was designed,
b) preventing liquid from being ejected from the tank if the latter is inclined or if waves of liquid are produced inside the tank,
c) automatically closing the tank if the latter is inverted,
d) adjusting the useful volume of the tank and preventing the tank from being filled beyond a predetermined level,
e) allowing gas to escape from the tank during filling thereof, which is characterized in that it comprises a valve element equipped with at least one flexible seal.

The tanks on which the valve according to the invention is mounted are closed chambers of varying shapes, generally sealed against the outside, which may be equipped with various internal accessories or accessories which pass through the wall of the chamber. In particular, they are fuel tanks for motor vehicles.

Examples of internal accessories or accessories that pass through the wall are, without implying any limitation, baffles for the liquid, gauges and temperature or pressure sensors, vent valves, filling nozzles, the pipes for withdrawing the liquid, and the withdrawing pumps.

The term "safety valve" is intended to denote a valve which plays a part in keeping the object on which it is mounted in a condition that is safe for the user, that is to say protected from any hazardous situation, particularly the risks of explosion, implosion, combustion or contamination of any kind, while at the same time preserving the external environment from any undesirable leak of liquid or emanation of gas.

In an attempt at being forearmed against such risks, the role of the safety valve mounted on a tank is to vent the tank, in other words to allow its programmed opening so as to fulfill the two distinct functions of allowing gas to escape when filling the tank and to ventilate the tank as its contents are used and consumed.

The operation of filling a tank with a liquid is necessarily accompanied by an increase in the pressure inside the tank. When the tank has a gas release circuit, the slight overpressure caused by the liquid freshly introduced into the tank tends to be cancelled out by the escape of a similar volume of the gas which occupied the tank. In the case of volatile liquids, the gas which escapes will be a somewhat homogeneous mixture of the gas present in the tank before filling and of vapours originating from the partial vaporization of the liquid introduced.

Furthermore, in normal use of the liquid contained in the tank, the volume thereof decreases as somewhat regular and/or continuous withdrawals are made. It is therefore necessary to provide and equip tanks with devices allowing air in so as to compensate for the loss of liquid during operation and thus prevent there being a depression in the tank and the dangers inherent to this situation.

The valve according to the invention is intended to equip the tanks which can contain any liquid which can be stored in a closed chamber under usual conditions.

It is well suited to the storage of volatile liquids at ambient temperature and pressure. Examples of such liquids are the organic liquids which give off a strong smell like the various solvents such as halogenated solvents, alcohols and esters and fuels such as kerosene, lamp oil, oil for oil-fired heating, petrol or diesel fuel, as well as heavy fuel. In particular, the valve according to the invention is advantageously used in tanks for storing liquid fuels such as petrol or diesel fuel in motor vehicles. It is most particularly suited to the tanks for storing diesel fuel in diesel-engine vehicles.

A first important function of the valve according to the invention is that of ventilating the tank when it is placed in the position for which it was designed, or when it is inclined with respect to this position.

The term "inclined" denotes the condition of the tank when it is subjected to small-amplitude movements resulting from the use of the tank and of the liquid contained which are compatible with the absence of flow of liquid by gravity from the tank via the valve.

In order to fulfill this function, the valve according to the invention must comprise means for performing this ventilation. All the means that allow this function to be fulfilled under conditions that are favourable to user safety may be suitable.

As examples of such means, mention may be made of the float valve, in which the float is secured to a valve element communicating with the outside, and the valve element of which remains in the open position under normal conditions of use. The dimensions of the float and of the attached element bearing the valve element are designed to allow ventilation under normal conditions, that is to say whether the tank is inclined or not and when the level of liquid prior to inclination does not exceed a certain threshold within the tank and when any angle of inclination does not exceed a critical angle.

One means that has given good results is the one employing a float valve secured to a valve element which remains in the open position when the valve is in the vertical or inclined position.

A second important function of the safety valve according to the invention is that of preventing liquid from being ejected from the tank when the tank is inclined as described above or when waves of liquid are produced inside it. The term "prevent" also comprises, in the case of the valve according to the invention, partial prevention as well as limiting the free flow of liquid from the tank.

Waves of liquid are the hydrodynamic movements which arise at the surface of the liquid and may be propagated throughout its mass in the tank when the tank is subjected to movements in various directions as a result of its use.

The safety valve according to the invention comprises means for preventing liquid from being ejected in the event of excessive inclination of the tank or in the event of waves of liquid of excessive amplitude being produced within it.

All effective means of blocking the orifices through which liquid passes towards the outside in the event of excessive inclination or excessive waves in the tank may be suitable.

An example of such means is the float valve secured to a shut-off valve element. The float slides in a barrel which may, as an alternative, extend under the valve and at the top of which there are the openings for the penetration of liquid into the valve. A spring pressing at the base of the float makes it possible, according to a particular embodiment, to compensate, completely or in part, for the frictional forces of the float as it slides against the internal walls of the barrel.

A careful choice of float size, particularly in terms of its height, of shut-off valve element and of any spring force, makes it possible to precisely set the angle of inclination beyond which a tank filled to its maximum level will cause closure of the valve and isolate the contents of the tank. Likewise, careful choice of the height by which the barrel extends under the valve makes it possible to influence the sensitivity of the closing of the valve to the energy of a given wave of liquid in the tank.

A means which has given good results is a float valve, sliding in a barrel, secured to a valve element capable of shutting off the pipe through which the gases pass. The float furthermore rests on a dense ball which becomes housed in an inverted frustoconical well when the valve/tank assembly is in a non-inclined position. When the inclination exceeds a certain angle, which depends on the mass of the ball, on the angle of the side walls of the well and on the weight of the float and on the frictional forces of this float in the barrel, the ball escapes from the well and lifts up the float and causes the valve to close.

Another important function of the valve according to the invention lies in its ability to close automatically as soon as the tank begins to roll over (a function known by the term "roll-over-valve", abbreviated to ROV). The term "rolling over" denotes a movement of sufficient amplitude for the level of liquid in the tank to be able to reach the valve simply under the effect of gravity. In particular, this term also denotes any situation in which the valve finds itself immersed in the liquid of the tank. More specifically still, it denotes the situation in which the tank has rotated through 180° with respect to the initial position for which it was designed.

This closure occurs automatically, that is to say without any other external intervention on the valve, be it human or produced by a motor or device of any kind capable of supplying energy.

Means for automatically closing the valve according to the invention in the event of an inversion of the tank are also present. Any means capable of closing and isolating the tank in the event of inversion are suitable.

An example of such a means is the one produced by complex valves comprising a float bearing a shut-off valve element and weighted down by means of a dense body which is secured to them, for example hollow floats containing the dense body inside their wall and a spring counterbalancing most of the weight of the dense body when the valve is in the vertical position of rest. When the tank and the valve are inverted, the weight of the dense body is added to the thrust of the spring to push the float thus submerged towards the valve element seat.

A means comprising a valve comprising a float, secured to a shut-off valve element, under which there is a dense ball capable of pushing the float under the effect of gravity towards the valve element seat in the event that the valve is inverted, has given excellent results.

Another function fulfilled by the valve according to the invention is that of fixing the useful volume of the tank and preventing the tank from being filled beyond a predetermined volume during a filling operation (this is also known as the "Overfill Prevention Valve" or "OPV" function).

The term "useful volume" is intended to denote the maximum permissible volume for the liquid introduced into the tank that is compatible with safe use giving rise to no overflow or to no danger to or pollution of the outside.

The safety valve according to the invention also comprises means for adjusting the useful volume of the tank and for fulfilling the OPV function.

Any reliable means allowing these functions to be fulfilled using a single valve may be suitable.

As a preference, use is made of a valve which does not require the presence or fitting of any pipework communicating with the tank filler neck. Such a valve comprises a float bearing a valve element which closes once the useful liquid level in the tank is reached. The valve element seat is liquid tight and gas tight and can withstand the overpressure which obtains in the tank as soon as the valve closes. This preferred valve is well suited to tanks which are filled using an automatic system which cuts off the inlet of fluid.

Another important function of the valve according to the invention is the possibility of allowing gas to escape from the tank on which it is mounted while this tank is being filled.

All means capable of fulfilling this function may be used in the valve according to the invention.

It is possible, for example, to use a float valve bearing a shut-off element.

A float valve secured to a valve element which remains open when the level of liquid in the tank does not carry the float beyond a certain level has given excellent results.

It is also advantageous, in another particularly preferred embodiment, to equip the valve with a barrel which extends far enough downwards under the float seat to prevent untimely closures of the valve when liquid is introduced into the tank at a high flow rate and produces large-amplitude waves within it. Aside from its usual action against the ejection of liquid from the tank when the tank is in motion, such a barrel also plays a part in ensuring permanent ventilation of the tank throughout the filling operation.

According to the invention, the safety valve comprises a valve element equipped with a flexible seal.

The term "valve element" is to be understood as meaning a closure device making it possible, at will, to cancel out the exchange of substance between a chamber and its external environment.

The flexible seal which equips the valve element comprises any deformable seal capable of being mounted on the valve element.

Another function that can be built into the safety valve according to the invention is that of performing safety ventilation of the tank in situations of excessive depression or excessive overpressure with respect to the external pressure.

What happens is that in certain situations, a depression may develop within a tank, for example when the tank is left closed and the temperature drops appreciably, thus causing the liquid and, to a greater extent the gas present in the closed tank, to contract. Another depression situation is the one in which the tank is closed and there is rapid and continuous consumption of liquid. An excessive depression inside the tank could lead to certain dangers and must be avoided by the implementation of means for ventilating the tank beyond a certain depression threshold.

In other situations, for example when the tank is stored full, with the valve closed, in an atmosphere where the temperature increases rapidly and significantly, a dangerous overpressure may develop inside the tank.

All means capable of forearming the tank against such excessive depressions or overpressures may be used in the valve according to the invention.

It is possible, for example, to use a system allowing air to be introduced through a secondary passage orifice.

The opening of this secondary passage orifice can be controlled by means of an additional seal separate from the one which seals the valve element or alternatively, as a variation, by means of a lightweight ball arranged in a well a short distance below an outlet orifice and thus acting as a non-return device for the air entering the tank.

It is also possible to incorporate this depression safety feature into the flexible seal that seals the valve element. As a preference, no secondary passage orifice distinct from the main ventilation orifice is used, but rather use is made of a system involving a valve element that can be fed with a low flow rate of air from the upper part of the valve head. This valve element opens only under the influence of a calibrated internal pressure that corresponds to the maximum pressure that is compatible with safe use of the tank.

As a preference, the valve element is equipped with at least one flexible seal which deforms to open a passage to the outside of the tank when a certain pressure or depression threshold is reached.

As a preference, the deformable flexible seal comprises lips which seal the tank closed. These lips have a thickness that is designed to allow them to deform under the influence of a given pressure difference exerted on their opposite faces. For each seal, there is an overpressure threshold or depression threshold for which the lips deform enough to open a passage in the valve element seat and thus place the inside of the tank in communication with the outside.

According to the invention, the flexible seal is capable of deforming and of opening in situations of depression and of overpressure with respect to the external pressure. Overpressure safety and depression safety may be provided by different seals.

As a preference, the same seal provides depression safety and overpressure safety. In this case, it may comprise lips which deform under the influence of the depression which are distinct from other lips which also form part of the same seal and which deform in the event of overpressure.

As a particular preference, the flexible seal providing depression and overpressure safety is the same as the flexible seal which seals the valve element.

According to a first embodiment of the valve according to the invention, the seal is mounted on a moving part of the valve secured to a float which slides in a barrel.

As a preference, the moving part has the shape of a needle valve bearing, at its end which co-operates with the valve element seat, a flexible annular seal which exhibits a deformable lip of annular shape intended to shut off the valve element seat. More often, the annular lip of the seal is made of a flexible thermoplastic.

As a preference, use is made in this embodiment of a seal which also ensures depression safety.

As a particular preference, this seal also, in addition to acting as a sealing element between the head of the valve and the depression safety float, ensures overpressure safety. Excellent results are obtained with a seal equipped with at least two distinct lips, one of them ensuring depression safety and the other ensuring overpressure safety.

According to a second embodiment of the valve according to the invention, the seal is mounted on the head of the valve. It is preferably in the form of an annular seal lining the valve element seat and mating with the shape of the moving part of the valve secured to a float. As a particular preference, the annular seal has deformable lips of annular shape which allow the tank to be sealed by cooperation with the moving part of the valve secured to a float sliding in a barrel.

In a way that is the parallel of the case of the seal of the first embodiment, mounted on the moving part of the valve, in this second embodiment, the seal can also fulfill the depression safety function. As a preference, it can also ensure the overpressure safety function. It may be equipped with distinct lips which ensure depression safety and overpressure safety.

An advantageous alternative form of the valve according to the invention is that of a valve which also comprises means for preventing dirt from getting into the tank and for limiting the emanation of odours from the liquid contained in this tank.

All means capable of equipping the valve according to the invention with anti-odour and dirt-protection properties are suitable.

From all the suitable means, it is possible to distinguish those which comprise, in the head of the valve, stationary orifices which open into a protected place out of reach of dirt. As a preference, these stationary orifices are located in a protected part of the valve, the shape of which forearms the orifices against any solid or liquid substance falling in from outside the tank, particularly merely under the effect of gravity. They may also, as an alternative, be connected to a pipe, the end of which lies in a protected region near the tank and out of reach of dirt.

An advantageous alternative form comprises a valve head with a mobile opening system. All mobile opening systems capable of being fitted to the valve according to the invention are suitable.

In a first embodiment, the mobile opening system is a mobile valve head cover which can open outwards under the action of a flow of gas leaving the valve.

Another possible embodiment of the mobile opening system comprises a valve head equipped with a flap which opens by pivoting about a hinge pin under the action of a flow of gas leaving the valve.

An alternative form of the valve according to the invention, which is preferred, comprises means for recovering droplets of liquid which might be entrained by a stream of gas leaving the tank. Various means capable of performing such recovery are envisagable.

In particular, it is possible to use a valve, the head of which contains, in its upper part, means for collecting liquid entrained by the flow of gas. As a preference, the top of the valve head comprises a low part where the liquid accumulates under gravity and where droplets form, grow, detach and drop into the tank.

As a preference, use is made of a mobile cover, as described above, which has a particular shape allowing the droplets of liquid which may have been entrained with the emerging flow of gas, to be collected and returned to the tank.

A shape of cover which is very suitable is that which comprises a hollow internal surface exhibiting a sharp angle on its perimeter and an inverted cone in its central part. It is furthermore advantageous for the axis of the cone to be coincident with that of the valve so as to correctly route the return of droplets to the tank through the opening of the valve element seat.

A preferred embodiment of the method of attaching the cover to the valve comprises clipping it into a system of at least two clips arranged on the upper part of the valve head on the periphery of the valve element seat opening.

In order that the clips should not become damaged when mounting the tank in its place of use or actually during use of the tank, it is advantageous that they be protected through the use of a valve, the head of which is equipped with at least two rigid stops projecting from the head and the length of which is at least equal to the height of the clips. As an alternative, it is advantageous for the stops also to be able to act as guides for the movement of the cover.

Another advantageous alternative form of the valve according to the invention relates to a valve which comprises at least one deflector capable of limiting the splashing of liquid when the tank is being filled. This deflector is generally in the form of a part which acts as a baffle to the passage of gases.

A valve in accordance with this alternative form comprises a deflector secured to or integral with the head of the valve.

Alternatively, another valve in accordance with this alternative form comprises a deflector secured to or integral with the barrel in which the float slides. Ideally, the deflector then lies at the location of the openings pierced in the upper part of the barrel for discharging the gases.

The valve described above meets the listed objectives, namely of being of a simple construction and of alone fulfilling all the functions necessary for safety of closing a liquid tank without requiring the presence of any other co-operating device and therefore of being highly reliable and less expensive than the complex systems hitherto known.

Another subject of the present invention relates to the use of the valve described above for venting a liquid fuel tank in a motor vehicle equipped with a diesel engine.

The appended FIGURE non-limitingly illustrates certain alternative forms of the invention, which have been produced by way of example.

It depicts diagrammatically and in elevation, a section through a valve in accordance with the invention.

The valve essentially comprises four distinct parts: a barrel (1) of cylindrical shape, immersed in a tank, in which there slides a moving part (2) surmounted by a head (3) extending beyond the wall of the tank and closed by a cover (4).

The moving part (2) is made up of a float (5), surmounted by a needle valve (6) which is secured to it and which can shut off the orifice (7) at the center of the head (3).

The float (5) rests on a ball (8) made of a dense material which is free to move in a well (9) located centrally in a bottom (10) secured to the walls of the barrel (1). An opening (11) is pierced in the base of the well (9) and allows liquid from the tank to pass. Other openings (not depicted) are also pierced in the walls of the well (9) and in the bottom (10).

The barrel (1) extends below the bottom (10) in the form of a skirt (12), the purpose of which is to limit the sensitivity of the valve to waves of liquid which may travel through the tank, during venting.

Openings (13) are pierced in the upper part of the barrel (1) and serve to remove gas from the tank or to introduce air from outside.

An annular seal (14) with deformable lips (15) arranged on the periphery of the orifice (7) co-operates with the needle valve (6) borne by the float (5) to form a valve element that sets the opening and closing of the valve.

The cover (4) can move upwards in guides (16) formed by the clips (17) arranged on the cover (4), under the influence of a flow of gas escaping from the tank through the orifice (7). The interior face of the cover (4) has a hollow space (18) and comprises a sharp angle (19) on its periphery and an inverted cone (20) in its central part, the point (21) of the cone lying on the axis (a, a') of the valve.

The way in which the valve depicted in the figure works is as follows.

When the liquid present in the tank is being used and its level in the tank is significantly below its maximum permitted safe level, it does not reach the base of the float (5). If the tank becomes inclined, the valve follows the movement and inclines by the same angle as the tank with respect to its initial position. If the angle of inclination of the tank is increased, then so long as the weight of the dense ball (8) increased by the weight of the float (5)/needle valve (6) pairing and by the frictional forces maintains a component tangential to the wall of the well (22) situated on the same side as the inclination that is smaller than its vertical component, the ball (8) will remain housed in the bottom of the well (9) and the needle valve (6) borne by the float (5) will maintain a passage between its upper part and the valve element seat delimited by the seal (14). As soon as the tangential component becomes slightly greater than the vertical component, because of the increase in the angle of inclination of the tank, the ball (8) will start to move on the wall of the well that is on the same side as the inclination and will cause the float to rise, bringing the needle valve (6) closer to the seal (14). During the entire period for which the valve element remains in the open position, the tank may be ventilated. The situation will change when the angle of inclination is steep enough to cause contact between the moving needle valve (6) and the seal (14). At this instant, the valve closes and tank ventilation ceases, thereby preventing liquid from being ejected from the inclined tank.

If waves are produced inside the tank, when their energy is great enough to lift the float (5), bearing in mind, however, the damping effect produced by the skirt (12), the valve closes and also prevents liquid from being ejected from the tank.

If the tank is inverted, the dense ball (8) will come to press with all its weight on the float (5) and rapidly close the passage to liquid, by virtue of contact between the needle valve (6) and the seal (14).

When the tank is being filled, when the maximum permissible safe volume of liquid is reached, the float (5), borne by the liquid, rises and closes off the valve element by virtue of contact between the needle valve (6) and the seal (14). The maximum permissible volume can be set by choosing the height of the float (5) and of the needle valve (6) and by adjusting the float line of the float (5).

If there is an attempt to fill the tank with liquid beyond the maximum permissible level, the pressure inside the tank increases and the liquid begins to rise up inside the filler nozzle, where it will soon act upon the device for automatically stopping this filling system.

Throughout the filling period during which the float (5) remains in its lowest position and during the period when the float begins to rise up inside the barrel (1) but has not yet reached a high enough level for the needle valve (6) to come into contact with the seal (14), gas can continue to escape from the tank.

When the full tank is left in position with the valve closed and the pressure increases sharply inside the tank for any reason, for example in the event of a significant rise in temperature, the lips (23) of the seal (14) in contact with the needle valve (6) can open and allow safety ventilation intended to cause the internal pressure to drop to below a value compatible with safe behaviour of the tank.

Likewise, in the opposite case, if an excessive depression occurs within the tank, the flat lips (15) of the seal (14) open and allow external air in through the secondary passage orifice (24) located at the periphery of the cover so as to make the use of the tank safe.

What is claimed is:

1. Safety valve for venting a liquid tank, comprising means for:
   (a) ventilating the tank, including when the latter is inclined with respect to the initial position for which it was designed;
   (b) preventing liquid from being ejected from the tank if the latter is inclined or if waves of liquid are produced inside the tank;
   (c) automatically closing the tank of the latter is inverted;
   (d) adjusting the useful volume of the tank and preventing the tank from being filled beyond a predetermined level;
   (e) allowing gas to escape from the tank during filling thereof;
said safety valve comprising a valve element equipped with at least one flexible seal which can deform and open in the event of an excessive pressure difference between the inside of the tank and the outside and provide safety ventilation of the tank when the latter exhibits a depression or an overpressure that exceeds a given threshold with respect to the external pressure.

2. Safety valve according to claim 1, wherein a single seal provides for the sealing of the valve element and for opening in the event of excessive depression and overpressure inside the tank with respect to the outside.

3. Safety valve according to claim 1, comprising means for preventing dirt from getting into the tank and for limiting the emanation of odours from the liquid contained in the tank towards the outside.

4. Safety valve according to claim 3, comprising a head equipped with stationary orifices opening into a protected place out of reach of dirt.

5. Safety valve according to claim 3, comprising a head equipped with a mobile cover which can open under the action of a flow of gas leaving the valve.

6. Safety valve for venting a liquid tank and fulfilling alone all the functions necessary for safely closing a liquid tank without requiring the presence of any other co-operating device, comprising means for:
   (a) ventilating the tank, including when the latter is inclined with respect to the initial position for which it was designed;
   (b) preventing liquid from being ejected from the tank if the latter is inclined or if waves of liquid are produced inside the tank;
   (c) automatically closing the tank if the latter is inverted;
   (d) adjusting the useful volume of the tank and preventing the tank from being filled beyond a predetermined level;
   (e) allowing gas to escape from the tank during filling thereof;
   (f) preventing dirt from getting into the tank;
   (g) limiting the emanation of odours from the liquid contained in the tank towards the outside;
said valve comprising a valve element equipped with at least one flexible seal and a head equipped with a flap which opens by pivoting about a hinge pin under the action of a flow of gas leaving the valve.

7. Safety valve according to claim 1, comprising means for recovering droplets of liquid entrained by a stream of gas leaving the tank.

8. Safety valve according to claim 1, comprising at least one deflector capable of limiting splashing of liquid when the tank is being filled.

9. Method for venting a fuel tank in a motor vehicle equipped with a diesel engine wherein a valve according to claim 1 safely vents the tank.

\* \* \* \* \*